(12) United States Patent
Gallucci et al.

(10) Patent No.: US 7,041,773 B2
(45) Date of Patent: May 9, 2006

(54) POLYIMIDE SULFONES, METHOD AND ARTICLES MADE THEREFROM

(75) Inventors: Robert R Gallucci, Mt. Vernon, IN (US); Roy Ray Odle, Mt. Vernon, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/672,705

(22) Filed: Sep. 26, 2003

(65) Prior Publication Data

US 2005/0070684 A1    Mar. 31, 2005

(51) Int. Cl.
C08G 73/10    (2006.01)
C08G 69/28    (2006.01)
B32B 27/00    (2006.01)

(52) U.S. Cl. ............ 528/170; 528/125; 528/126; 528/128; 528/171; 528/172; 528/173; 528/174; 528/176; 528/183; 528/185; 528/188; 528/350; 528/353; 528/480; 528/502 R; 428/473.5; 428/411.1; 428/458; 264/176.1

(58) Field of Classification Search ............ 528/170, 528/353, 480, 502 R, 125, 128, 171, 172, 528/176, 183, 185, 188; 428/473.5, 411.1, 428/458; 264/176.1
See application file for complete search history.

(56) References Cited

U.S. PATENT DOCUMENTS

| | | | |
|---|---|---|---|
| 2,991,273 A | 7/1961 | Heckelhammer | 264/492 |
| 2,999,835 A | 9/1961 | Goldberg | 524/267 |
| 3,028,365 A | 4/1962 | Schnell et al. | 528/196 |
| 3,148,172 A | 9/1964 | Fox et al. | 528/196 |
| 3,153,008 A | 10/1964 | Fox | 528/196 |
| 3,271,367 A | 9/1966 | Schnell et al. | 528/171 |
| 3,271,368 A | 9/1966 | Goldberg et al. | 528/174 |
| 3,814,869 A | 6/1974 | DeLuca | 379/21 |
| 3,847,867 A | 11/1974 | Heath et al. | 528/26 |
| 3,850,885 A | 11/1974 | Takekoshi et al. | 528/170 |
| 3,852,242 A | 12/1974 | White | 528/170 |
| 3,855,178 A | 12/1974 | White et al. | 524/392 |
| 3,972,902 A | 8/1976 | Heath et al. | 528/173 |
| 3,983,093 A | 9/1976 | Williams, III et al. | 528/128 |
| 4,217,438 A | 8/1980 | Brunelle et al. | 528/202 |
| 4,293,683 A | 10/1981 | Takekoshi et al. | 528/180 |
| 4,324,882 A | 4/1982 | Takekoshi | 528/206 |
| 4,443,591 A | 4/1984 | Schmidt et al. | 528/128 |
| 4,455,410 A | 6/1984 | Giles, Jr. | 525/436 |
| 4,508,861 A | 4/1985 | Avakian | 524/101 |
| 4,565,858 A | 1/1986 | Klopper | 528/172 |
| 4,689,391 A * | 8/1987 | Peters et al. | 528/179 |
| 4,837,299 A * | 6/1989 | Peters et al. | 528/353 |
| 4,910,288 A | 3/1990 | Dellacoletta | 528/353 |
| 4,933,132 A * | 6/1990 | Vora | 264/331.14 |
| 4,965,337 A * | 10/1990 | Peters et al. | 528/353 |
| 5,189,137 A | 2/1993 | Howson et al. | 528/171 |
| 5,200,465 A | 4/1993 | Hellstern et al. | 525/66 |
| 6,001,957 A * | 12/1999 | Puyenbroek et al. | 528/332 |
| 6,569,984 B1 * | 5/2003 | McGrath et al. | 528/170 |
| 6,710,187 B1 | 3/2004 | Guggenheim et al. | 549/241 |
| 6,713,597 B1 * | 3/2004 | Lindway | 528/353 |
| 6,906,168 B1 * | 6/2005 | Khouri et al. | 528/480 |
| 2003/0067089 A1 | 4/2003 | Wang et al. | 264/102 |
| 2004/0015328 A1 | 1/2004 | Guggenheim et al. | 702/172 |
| 2004/0260055 A1 | 12/2004 | Gallucci et al. | 528/353 |
| 2005/0070684 A1 * | 3/2005 | Gallucci et al. | 528/170 |

FOREIGN PATENT DOCUMENTS

EP    0226204    6/1987

OTHER PUBLICATIONS

Herbert S.-I. Chao; "A 31P NMR Study of Poly(phenylene oxide) (PPO)(1) Resin's Hydroxyl End Groups"; Polymer Bulletin, 1987; vol. 17; 397-401.

Kim; "Kinetic and Mechanistic Investigations of the Formation of Polymides Under Homogeneous Conditions"; Macromolecules, 1993; vol. 26; 1344-1358.

Kreuz; "Studies of Thermal Cyclizations of Polyamic Acids and Tertiary Amine Salts"; Journal of Polymer Science: Part A-1; 1966; vol. 4; 2607-2616.

Chan; "Facile Quantitative Analysis of Hydroxyl End Groups of Poly(2,6-dimethyl-1,4-phenylene oxide)s by 31P NMR Spectroscopy"; Macromolecules, 1994; vol. 27; 6371-6375.

ASTM D3835-96; "Standard Test Method for Determination of Properties of Polymeric Materials by Means of a Capillary Rheometer1;"Annual Book of ASTM Standards 2002; vol. 08.02; pp. 483-494.

International Search Report; PCT/US2004/031057; date mailed Dec. 14, 2004.

* cited by examiner

Primary Examiner—P. Hampton Hightower

(57) ABSTRACT

Polyimide sulfone resins are provided with a glass transition temperature of from 200–350° C., residual volatile species concentration of less than 500 ppm and a total reactive end group concentration of less than about 120 milliequivalents/kilogram resin. The resins have high heat capability and good melt stability. Methods to prepare the said resins and articles made from the resins are also provided.

65 Claims, No Drawings

POLYIMIDE SULFONES, METHOD AND ARTICLES MADE THEREFROM

BACKGROUND OF THE INVENTION

Polyimides are known to be useful high performance polymers. Polyetherimides are a particular class of polyimides which combine the high temperature characteristics of polyimides but still have sufficient melt processability to be easily formed by conventional molding techniques such as compression molding, gas assist molding, profile extrusion, thermoforming and injection molding. Similarly polysulfones are also known as useful engineering thermoplastics which generally have transparency, low color, resistance to hydrolysis, good melt processability and high temperature resistance. Methods are continually sought to prepare polymeric resins which combine the desirable properties of polyimides and polysulfones into a single resin, such as in a polyimide sulfone or a polyetherimide sulfone.

Good melt processability is a key attribute for both polyetherimides and polysulfones. It allows them to be quickly and easily formed into articles by extrusion and molding processes. However, good melt processability requires low levels of residual volatile species such as residual solvent and/or residual water, typically less than 500 ppm. Higher levels of residual volatile species generate bubbles and gassing which causes problems during melt processing of the resins into film and shaped parts by extrusion or injection molding processing. Such generation of volatile species from the molten resin can render articles made by a melt process unfit for use due to the presence of voids, bubbles, splay, silver streaks or other imperfections.

Another source of volatile species during melt processing is by reaction of the polymer, for example by reaction of the polymer end groups or cyclization of amide-acid groups remaining after the initial polymerization to make polyetherimides. These types of residual groups can react during melt processing to generate volatile species through condensation reactions. These volatile species can generate parts with similar defects as seen due to residual solvent. Thus polymeric resins which combine the desirable properties of polyimides and polysulfones must be made by a process that limits residual volatile species while giving low levels of residual end groups and amide-acid functionality.

U.S. Pat. No. 4,565,858 describes polyetherimide sulfones. However the importance of the full removal of solvent is not discussed nor is the level of residual groups. In certain examples the patent teaches isolation of the polymer by redissolving in chloroform, precipitation by addition to methanol and vacuum drying. This isolation method adds many extra steps to the process and generates a large amount of liquid waste, methanol and chloroform, which must be disposed of. The precipitation method described in this patent also gives a powder that requires another heat history before it can be made into conveniently used pellet form. A pellet form is desirable because pellets can be used directly in melt processing equipment such as extruders and molding machines.

While U.S. Pat. No. 4,565,858 does discuss end capping the resin with phthalic anhydride, no mention is made of the need to reduce the level of reactive groups to achieve optimal performance. High levels of end groups may react with each other or other additives in the resin mixture during subsequent melt processing generating water and changing the melt viscosity making melt processing difficult to control due to the changing nature of the polymer viscosity and the escape of water generated from the molten resin. Escaping water can also cause splay and silver streaking in molded parts. There remains a need for a method to prepare polymeric resins which have the desirable properties of polyimides and polysulfones in a single resin, such as in a polyetherimide sulfone, wherein said resins have a low level of residual volatile species such as residual solvent and a low level of potentially reactive groups which may generate volatile species during thermal processing.

BRIEF DESCRIPTION OF THE INVENTION

The present inventors have discovered polymeric resins which combine the desirable properties of polyimides and polysulfones into a single resin, such as in a polyetherimide sulfone. The said resins have low levels of residual volatile species and low levels of reactive groups, such that articles may be prepared from the said resins which are generally free of voids, bubbles, splay, silver streaks or other imperfections. The said resins have good heat resistance and surprisingly good melt processability.

In one embodiment the present invention is a polyimide sulfone resin with a glass transition temperature of from 200–350° C., residual volatile species concentration of less than 500 ppm and a total reactive end group concentration of less than about 120 milliequivalents/kilogram resin. Methods to prepare the said resins and articles made from the resins are also provided.

Various other features, aspects, and advantages of the present invention will become more apparent with reference to the following description, examples, and appended claims.

DETAILED DESCRIPTION OF THE INVENTION

In this specification and in the claims that follow, reference will be made to a number of terms that shall be defined to have the following meaning. The singular forms "a", "an" and "the" include plural referents unless the context clearly dictates otherwise. "Optional" or "optionally" mean that the subsequently described event or circumstance may or may not occur, and that the description includes instances where said event or circumstance occurs and instances where it does not.

Polyimide sulfone resins of the present invention comprise structural units having the general formula (I)

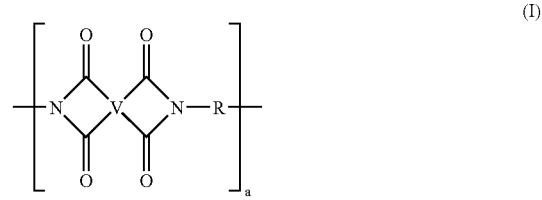

wherein a is more than 1, typically about 10 to about 1000 or more, and more preferably about 10 to about 500; and V is a tetravalent linker without limitation, as long as the linker does not impede synthesis or use of the polyimide sulfone. Suitable linkers include but are not limited to: (a) substituted or unsubstituted, saturated, unsaturated or aromatic monocyclic or polycyclic groups having about 5 to about 50 carbon atoms, (b) substituted or unsubstituted, linear or branched, saturated or unsaturated alkyl groups having 1 to about 30 carbon atoms; or combinations thereof. Preferred linkers include but are not limited to tetravalent aromatic radicals of formula (II), such as

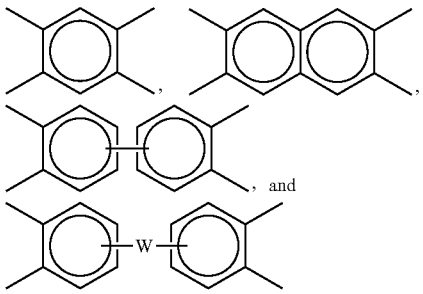

, and wherein W is in some embodiments a divalent moiety selected from the group consisting of —O—, —S—, —C(O)—, —SO$_2$—, C$_y$H$_{2y}$— (y being an integer from 1 to 5), a halogenated derivatives thereof, including perfluoroalkylene groups, or a group of the formula —O-D-O— wherein the divalent bonds of the —O— or the —O-D-O— group are in the 3,3', 3,4', 4,3', or the 4,4' positions, and wherein D comprises divalent radicals of formula (III). Groups free of benzylic protons are often preferred for superior melt stability.

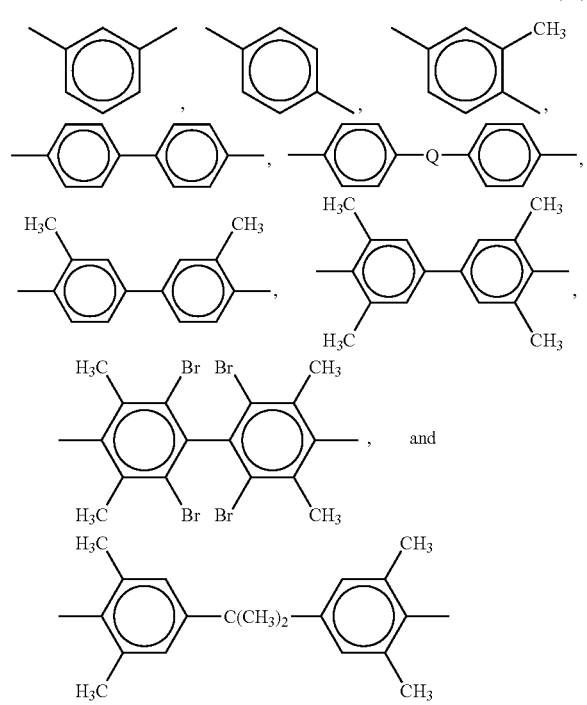

R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV)

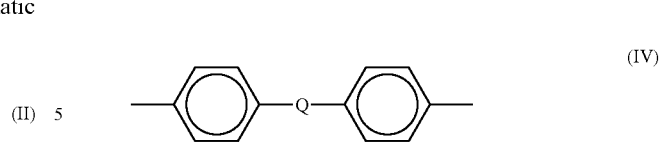

wherein Q includes but is not limited to a divalent moiety selected from the group consisting of —O—, —S—, —C(O)—, —SO$_2$—, C$_y$H$_{2y}$— (y being an integer from 1 to 5), a halogenated derivatives thereof, including perfluoroalkylene groups. In particular embodiments R is essentially free of benzylic hydrogens. In another particular embodiment the polyimide sulfone is a polyetherimide sulfone and R also contains aryl sulfone and/or aryl ether linkages such that at least 50 mole % of the repeat units of any polyetherimide sulfone contain at least one aryl ether linkage, at least one aryl sulfone linkage and at least two aryl imide linkages.

In still other embodiments the linking group W in tetravalent aromatic radicals of formula (II) comprises a group of the formula —O-D-O— as in the formula (V):

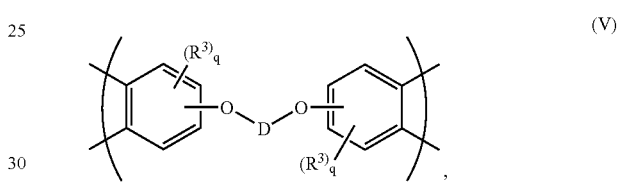

wherein R$^3$ is selected from the group consisting of halogen, fluoro, chloro, bromo, C$_{1-32}$ alkyl, cycloalkyl, or alkenyl; C$_{1-32}$ alkoxy or alkenyloxy; or cyano, and "q" has a value of 0–3. In some particular embodiments the value of "q" is zero.

In the formula (V), "D" is a divalent aromatic group derived from a dihydroxy substituted aromatic hydrocarbon, and has the general formula (VI):

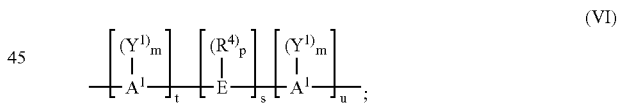

where "A$^1$" represents an aromatic group including, but not limited to, phenylene, biphenylene, naphthylene, etc. In some embodiments, "E" may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments, when "E" is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments, "E" may be a cycloaliphatic group non-limiting examples of which include cyclopentylidene, cyclohexylidene, 3,3,5-trimethylcyclohexylidene, methylcyclohexylidene, bicyclo

[2.2.1]hept-2-ylidene, 1,7,7-trimethylbicyclo[2.2.1]hept-2-ylidene, isopropylidene, neopentylidene, cyclopentadecylidene, cyclododecylidene, and adamantylidene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^4$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^4$ may be halogen-substituted, particularly fluoro- or chloro-substituted, for example as in dihaloalkylidene group of formula $C=CZ_2$, wherein each Z is hydrogen, chlorine, or bromine, subject to the provision that at least one Z is chlorine or bromine; and mixtures of the foregoing moieties. In a particular embodiment, the dihaloalkylidene group is a dichloroalkylidene, particularly gem-dichloroalkylidene group. $Y^1$ independently at each occurrence may be an inorganic atom including, but not limited to, halogen (fluorine, bromine, chlorine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^5$ wherein $R^5$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$–$C_6$ alkyl group. The letter "m" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero. In some particular embodiments "u" is an integer with a value of from 0 to about 5.

In dihydroxy-substituted aromatic hydrocarbons in which "D" is represented by formula (VI) above, when more than one $Y^1$ substituent is present, they may be the same or different. The same holds true for the $R^1$ substituent. Where "s" is zero in formula (VI) and "u" is not zero, the aromatic rings are directly joined by a covalent bond with no intervening alkylidene or other bridge. The positions of the hydroxyl groups and $y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons, "E" may be an unsaturated alkylidene group. Suitable dihydroxy-substituted aromatic hydrocarbons of this type include those of the formula (VII):

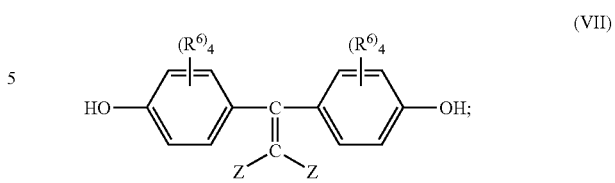

where each $R^6$ is independently hydrogen, chlorine, bromine, or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (VIII):

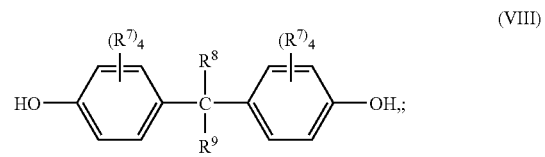

where each $R^7$ is independently hydrogen, chlorine, bromine, or a $C_{1-30}$ monovalent hydrocarbon or hydrocarbonoxy group, and $R^8$ and $R^9$ are independently hydrogen or a $C_{1-30}$ hydrocarbon group.

In embodiments of the present invention, dihydroxy-substituted aromatic hydrocarbons that may be used include those disclosed by name or formula (generic or specific) in U.S. Pat. Nos. 2,991,273, 2,999,835, 3,028,365, 3,148,172, 3,153,008, 3,271,367, 3,271,368, and 4,217,438. In some embodiments of the invention, dihydroxy-substituted aromatic hydrocarbons include, but are not limited to, bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis(3,5-dimethylphenyl-4-hydroxyphenyl) methane; 1,1-bis(3,5-dimethylphenyl-4-hydroxyphenyl) ethane; 2,2-bis(3,5-dimethylphenyl-4-hydroxyphenyl)

propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl)sulfoxide, bis(3,5-dimethyl-4-hydroxyphenyl)sulfone and bis(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when the moiety "E" is an alkylene or alkylidene group, it may be part of one or more fused rings attached to one or more aromatic groups bearing one hydroxy substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols, illustrative examples of which include 2,2,2',2'-tetrahydro-3,3,3',3'-tetramethyl-1,1'-spirobi[1H-indene]-6,6'-diol (sometimes known as "SBI"). Mixtures comprising any of the foregoing dihydroxy-substituted aromatic hydrocarbons may also be employed.

Preferred polyimide sulfone resins are polyetherimide sulfone resins comprising more than 1, typically about 10 to about 1000 or more, and more preferably about 10 to about 500 structural units, of the formula (IX)

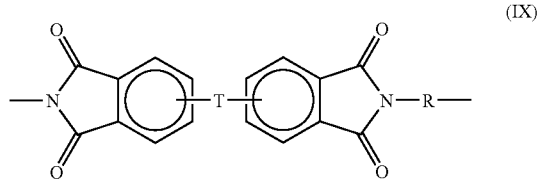

(IX)

wherein the moiety R is as previously defined for formula (I); T is —O— or a group of the formula —O-D-O— wherein the divalent bonds of the —O— or the —O-D-O— group are in the 3,3', 3,4', 4,3', or the 4,4' positions, and wherein D includes, but is not limited to, divalent radicals as defined above.

In other embodiments a polyetherimide sulfone may be a copolymer, which, in addition to the etherimide units described above, further contains polyimide structural units of the formula (X)

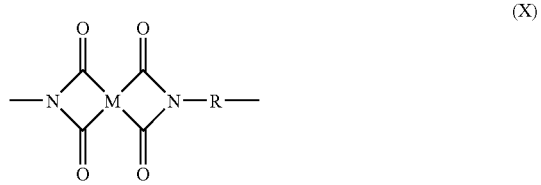

(X)

wherein R is as previously defined for formula (I) and M includes, but is not limited to, radicals of formula (XI).

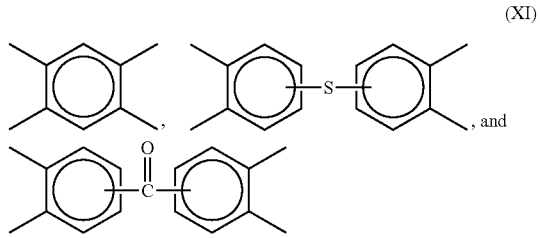

(XI)

Thermoplastic polyimide sulfones of the invention can be derived from reactants comprising one or more aromatic diamines or their chemically equivalent derivatives and one or more aromatic tetracarboxylic acid cyclic dianhydrides (sometimes referred to hereinafter as aromatic dianhydrides), aromatic tetracarboxylic acids, or their derivatives capable of forming cyclic anhydrides. In addition at least a portion of one or the other of or at least a portion of each of the reactants comprising aromatic diamines and aromatic dianhydrides comprises a sulfone linkage. In a particular embodiment all of one or the other of or each of the reactants comprising aromatic diamines and aromatic dianhydrides comprises a sulfone linkage. The reactants react to form polymers comprising cyclic imide linkages and sulfone linkages.

Examples of some specific aromatic dianhydrides and aromatic diamines are disclosed, for example, in U.S. Pat. Nos. 3,972,902 and 4,455,410. Illustrative examples of aromatic dianhydrides also comprise: 4,4'-bis(3,4-dicarboxyphenoxy)diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride and mixtures thereof.

Other useful aromatic dianhydrides comprise: 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 2-[4-(3,4-dicarboxyphenoxy)phenyl]-2-[4-(2,3-dicarboxyphenoxy)phenyl]propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 1,4,5,8-naphthalenetetracarboxylic acid dianhydride; 3,4,3',4'-benzophenonetetracarboxylic acid dianhydride; 2,3,3',4'-benzophenonetetracarboxylic acid dianhydride; 3,4,3',4'-oxydiphthalic anhydride; 2,3,3',4'-oxydiphthalic anhydride; 3,3',4,4'-biphenyltetracarboxylic acid dianhydride; 2,3,3',4'-biphenyltetracarboxylic acid dianhydride; 2,3,2',3'-biphenyltetracarboxylic acid dianhydride; pyromellitic dianhydride; 3,4,3',4'-diphenylsulfonetetracarboxylic acid dianhydride; 2,3,3',4'-diphenylsulfonetetracarboxylic acid dianhydride; 1,4-bis(3,4-dicarboxyphenoxy)benzene dianhydride; and 2,2-bis(3,4-dicarboxyphenyl)hexafluoropropane dianhydride. Polyimide sulfones with structural units derived from mixtures comprising two or more dianhydrides are also within the scope of the invention.

In one particular embodiment the aromatic dianhydride employed in the synthesis of the polyimide sulfone composition comprises an aromatic bis(ether anhydride) composition comprising at least about 90 mole % 2,2-bis[4-(3,4-dicarboxyphenoxy)phenyl]propane dianhydride, or at least about 95 mole % 2,2-bis[4-(3,4-dicarboxyphenoxy)phenyl] propane dianhydride based on total moles dianhydride present. Sometimes hereinafter this particular aromatic bis (ether anhydride) composition is referred to as bisphenol A dianhydride or "BPADA". In other embodiments preferred aromatic dianhydrides are bisphenol A dianhydride, pyromellitic dianhydride, biphenyltetracarboxylic acid dianhydride, oxydiphthalic anhydride and mixtures thereof.

In various embodiments suitable aromatic diamines comprise a divalent organic radical selected from aromatic hydrocarbon radicals having 6 to about 24 carbon atoms and substituted derivatives thereof. In various embodiments said aromatic hydrocarbon radicals may be monocyclic, polycyclic or fused.

In some embodiments suitable aromatic diamines comprise divalent aromatic hydrocarbon radicals of the general formula (XII)

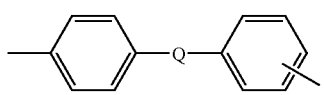

(XII)

wherein the unassigned positional isomer about the aromatic ring is either meta or para to Q, and Q is a covalent bond or a member selected from the group consisting of formulas (XIII):

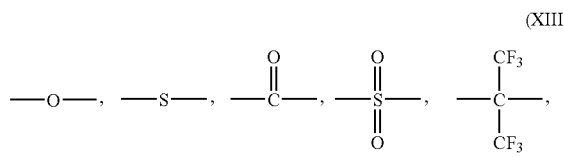

(XIII)

and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (XII) is para to Q.

In various embodiments the two amino groups in aromatic diamines are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. In illustrative non-limiting examples aromatic diamines comprise aromatic hydrocarbon radicals including, but not limited to, phenyl, biphenyl, naphthyl, bis(phenyl)-2,2-propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, tert-butyl, or mixtures thereof. In particular embodiments substituents for aromatic hydrocarbon radicals, when present, are selected from the group consisting of halogens, chloro, ethers, sulfones, perfluoroalkyl, methyl, t-butyl and mixtures thereof. In other particular embodiments said aromatic hydrocarbon radicals are unsubstituted.

In some particular embodiments suitable aromatic diamines comprise meta-phenylenediamine; para-phenylenediamine; mixtures of meta- and para-phenylenediamine; isomeric 2-methyl- and 5-methyl-4,6-diethyl-1,3-phenylene-diamines or their mixtures; bis(4-aminophenyl)-2,2-propane; bis(2-chloro-4-amino-3,5-diethylphenyl) methane, 4,4'-diaminodiphenyl, 3,4'-diaminodiphenyl, 4,4'-diaminodiphenyl ether (sometimes referred to as 4,4'-oxydianiline); 3,4'-diaminodiphenyl ether, 3,3'-diaminodiphenyl ether, 4,4'-diaminodiphenyl sulfone, 3,4'-diaminodiphenyl sulfone, 3,3'-diaminodiphenyl sulfone, 4,4'-diaminodiphenyl sulfide; 3,4'-diaminodiphenyl sulfide; 4,4'-diaminodiphenyl ketone, 3,4'-diaminodiphenyl ketone, 4,4'-diaminodiphenylmethane (commonly named 4,4'-methylenedianiline); 4,4'-bis(4-aminophenoxy)biphenyl, 4,4'-bis(3-aminophenoxy)biphenyl, 1,5-diaminonaphthalene; 3,3-dimethylbenzidine; 3,3-dimethoxybenzidine; benzidine; m-xylylenediamine; bis(aminophenoxy)fluorene, bis(aminophenoxy)benzene, 1,3-bis(3-aminophenoxy)benzene, 1,3-bis(4-aminophenoxy)benzene, 1,4-bis(4-aminophenoxy) benzene, bis(aminophenoxy)phenyl sulfone, bis(4-(4-aminophenoxy)phenyl)sulfone, bis(4-(3-aminophenoxy) phenyl)sulfone, diaminobenzanilide, 3,3'-diaminobenzophenone, 4,4'-diaminobenzophenone, 2,2'-bis (4-(4-aminophenoxy)phenyl)propane, 2,2-bis[4-(4-aminophenoxy)phenyl]hexafluoropropane, 4,4'-bis (aminophenyl)hexafluoropropane, 1,3-diamino-4-isopropylbenzene; 1,2-bis(3-aminophenoxy)ethane; 2,4-bis (beta-amino-t-butyl)toluene; bis(p-beta-methyl-o-aminophenyl)benzene; bis(p-beta-amino-t-butylphenyl) ether and 2,4-toluenediamine. Mixtures of two or more diamines may also be employed. The most preferred diamines are meta- and para-phenylene diamines, 4,4'-diaminodiphenyl sulfone and oxydianiline.

The preferred aromatic diamines are free of benzylic hydrogens and also contain aryl sulfone linkages. Diaminodiphenyl sulfone (DDS), bis(aminophenoxy phenyl)sulfones (BAPS) and mixtures thereof are particularly preferred aromatic diamines.

The polyimide sulfones of the present invention can be prepared by any of the methods known to those skilled in the art, including in the case of polyetherimide sulfones the reaction of an aromatic bis(ether anhydride) of the formula (XIV)

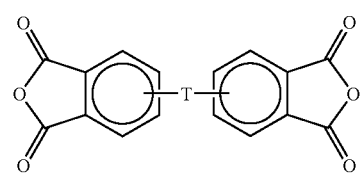

(XIV)

with an organic diamine of the formula (XV)

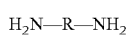

(XV)

wherein R and T are defined as described above in formulas (I) and (IX).

In a particularly preferred embodiment, polyetherimide sulfone resins comprise structural units according to formula (IX) wherein each R is independently derived from diaminodiphenyl sulfone or bis(aminophenoxy phenyl)sulfones or a mixture thereof and T is a divalent radical of the formula (XVI)

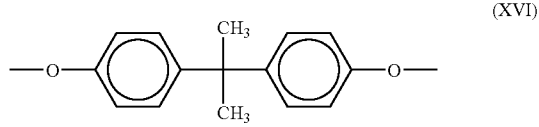

Branching agents may also be employed in the reaction to prepare polyimide sulfones. When polyetherimide/polyimide sulfone copolymers are prepared, a dianhydride, such as pyromellitic anhydride or oxydiphthalic anhydride, may be used in combination with a bis(ether anhydride).

In some embodiments the polyimide sulfone resins (or polyetherimide sulfone resins) can be prepared from reaction of an aromatic dianhydride monomer (or aromatic bis(ether anhydride)monomer) with an organic diamine monomer wherein the two monomers are present in essentially equimolar amounts, or wherein one monomer is present in the reaction mixture at no more than about 0.2 molar excess, and preferably less than about 0.2 molar excess in relation to the other monomer, or wherein one monomer is present in the reaction mixture at no more than about 0.1 molar excess, and preferably less than about 0.1 molar excess in relation to the other monomer, or wherein one monomer is present in the reaction mixture at no more than about 0.05 molar excess, and preferably less than about 0.05 molar excess in relation to the other monomer, or wherein one monomer is present in the reaction mixture at no more than about 0.02 molar excess, and preferably less than about 0.02 molar excess in relation to the other monomer.

Primary monoamines may be used to end cap or chain-stop the polyimide sulfone, for example, to control molecular weight. In a particular embodiment primary monoamines comprise aromatic primary monoamines, illustrative examples of which comprise aniline, chloroaniline, perfluoromethyl aniline, naphthyl amines and the like. Aromatic primary monoamines may have additional functionality bound to the aromatic ring: such as, but not limited to, aryl groups, alkyl groups, aryl-alkyl groups, sulfone groups, ester groups, amide groups, halogens, halogenated alkyl or aryl groups, alkyl ether groups, aryl ether groups, or aryl keto groups. The attached functionality should not impede the function of the aromatic primary monoamine to control polyimide sulfone molecular weight. Aromatic primary monoamines containing functionality selected from the group consisting of hydrogen, ethers, sulfones and perfluoroalkyl groups are preferred.

Aromatic dicarboxylic acid anhydrides, that is aromatic groups comprising one cyclic anhydride group, may also be used to control molecular weight in polyimide sulfones. Illustrative examples comprise phthalic anhydride, substituted phthalic anhydrides, such as chlorophthalic anhydride, and the like. Said anhydrides may have additional functionality bound to the aromatic ring, illustrative examples of which comprise those functionalities described above for aromatic primary monoamines.

In some embodiments of the invention the primary monoamine chain-stopper, for example aniline, or aromatic dicarboxylic acid anhydride chain-stopper, for example phthalic anhydride, can be incorporated into the polyimide sulfone during polymerization or as part of the prepolymer prior to melt polymerization. In one procedure, for example, the aromatic dianhydride and aromatic diamine can be polymerized in the presence of the chain-stopper. Alternatively, a chain-stopper may be added when the polymerization reaction is greater than 90% complete, or greater than 95% complete or greater than about 98% complete. In another procedure the chain-stopper can be incorporated into the prepolymer chain ends prior to melt polymerization. In a further procedure the chain-stopper can be added to the prepolymer prior to melt polymerization. Any chain-stopper may be added in one portion or in more than one portion in any process. In another embodiment primary monoamine chain-stopper and organic diamine monomer are intimately combined and added together to a reaction mixture in solvent comprising aromatic dianhydride. The aromatic monoamine chain-stopper and organic diamine monomer may be intimately combined using known methods, illustrative examples of which include combination through a static mixer or mixing in solvent.

One aspect of the invention is a process to prepare a polyimide sulfone comprising reaction of an aromatic diamine having a molecular weight from 100 to 500 with an aromatic dianhydride with a molecular weight from 218 to 1000 wherein the molecular weight of the polyimide sulfone is controlled by addition of a aromatic primary monoamine capping agent of molecular weight 93 to 250. In another aspect of the invention the aromatic diamine has a molecular weight from 108 to 200 and the aromatic dianhydride has a molecular weight from 300 to 700. Another aspect of the invention is a process to prepare a polyimide sulfone comprising reaction of an aromatic diamine having a molecular weight from 100 to 500 with an aromatic dianhydride with a molecular weight from 218 to 1000 wherein the molecular weight of the polyimide sulfone is controlled by addition of an aromatic dicarboxylic acid anhydride capping agent of molecular weight 148 to 500.

Another aspect of the invention is a method to make polyimide sulfones such as polyetherimide sulfones with the stability needed for melt processing such that there is relatively little molecular weight change during the melting and part forming procedure. This requires that the polymer be essentially free of linkages that will react in the melt to change molecular weight. The presence of benzylic protons in polyimide sulfones typically accelerates reactions that change molecular weight in the melt. Due to the increased melt stability of the resultant polymer, polyimide sulfones with structural units derived from aromatic diamines, aromatic dianhydrides and capping agents essentially free of benzylic protons may be preferred in some applications, especially those involving isolation from the melt and melt processing after polymerization. In the present context essentially free of benzylic protons means that the polyimide sulfone product has less than 5 mole % of structural units, or less than 3 mole % structural units, or less than 1 mole % structural units derived from monomers and/or end cappers containing benzylic protons. In one particular embodiment essentially free of benzylic protons means that the polyimide sulfone product has zero mole % of structural units derived from monomers and/or end cappers containing benzylic protons.

Included among the many methods suitable for making polyimide sulfones, particularly polyetherimide sulfones, are those disclosed in U.S. Pat. Nos. 3,847,867, 3,814,869, 3,850,885, 3,852,242, 3,855,178, 3,983,093, and 4,443,591. These patents are shown for the purpose of teaching, by way of illustration, general and specific methods for preparing polyimide sulfones. Known processes to prepare polyimide sulfones are included in the scope of this invention. In one particular embodiment polyimide sulfones may be made in a melt polymerization process. Generally, melt polymerizations employ temperatures of about 150° C. to about 400° C. with provision made for removal of water of polymerization.

In another particular embodiment polyimide sulfones may be made in a solvent process. Typically, polymerization in a solvent takes place at temperatures of about 100° C. to about 250° C. Solvents with a boiling point of greater than about 150° C. at atmospheric pressure are preferred. The high boiling point typically allows the polymerization reaction to be carried out at higher temperature which improves the reaction rate and facilitates reaction of less nucleophilic diamines such as diaminodiphenyl sulfone. The higher temperature also typically allows the polymer to remain in solution, thus facilitating the build of higher molecular weight. Higher molecular weight polymer often gives better mechanical properties in articles formed from polyimide sulfone resins.

Solvents with a flash point, as measured by the closed cup method, of more than about 70° C. are preferred, to reduce the potential likelihood of fire. Solvents with a flash point, or an auto ignition temperature, above 100° C. are most preferred. Flash points are known or can be measured using known methods, for example closed cup flash point as described in ASTM methods D93 and D56. Open cup flash point can be measured by ASTM method D310.

Solvents with a polarity index of greater than or equal to 2.3 are preferred for their ability to dissolve the aromatic dianhydride and aromatic diamine reactants and the resultant polyimide sulfone resin, facilitating the stirring, pumping and handling of the polymer solution. Solvent polarities are known or can be measured using known methods, as for example in L. R. Snyder, J. of Chromatographic Sci., vol. 16, pp. 223–234 (1978).

Examples of suitable solvents include, but are not limited to, halogenated aromatics, chlorobenzene, dichlorobenzene, ortho-dichlorobenzene (ODCB), bromobenzene, nitrobenzene, diphenyl sulfones, aryl ethers, diphenyl ethers, N-methyl pyrrolidinone, dimethyl sulfoxide, dimethyl acetamide, dimethyl formamide, hexamethyl phosphoramide, benzonitrile, pyridine, pyrrole, sulfolane, methyl benzoate, alkoxy aromatics, anisole, phenetole, veratrole and the like. Mixtures of solvents may also be employed.

Preferred solvents include, but are not limited to, N-methyl pyrrolidinone, dimethyl sulfoxide, dimethyl acetamide, dimethyl formamide, aromatic nitriles and mixtures thereof. Solvents that are liquids at room temperature are often preferred for their ease of handling.

It is often advantageous to use catalysts during the polymerization of polyimide sulfones. Examples of catalysts are the alkali metal salts of oxygenated compounds as described in U.S. Pat. No. 4,324,882, or alkali metal or zinc carboxylic acid salts as described in U.S. Pat. No. 4,293,683. Other catalysts may also be employed in effective amounts to facilitate imide formation. A preferred catalyst is sodium phenyl phosphinate also known as phenyl phosphinic acid, sodium salt. Catalyst levels can vary widely, for example from 10–5000 ppm based on weight of the polymer.

Generally, polyimide sulfone resins and particularly polyetherimide sulfones of the invention have a melt index of about 0.1 to about 10 grams per minute (g/min), as measured by ASTM D1238 at 337° C., using a 6.6 kilogram (kg) weight. In a preferred embodiment polyimide sulfone resins have a weight average molecular weight (Mw) of about 10,000 to about 150,000 daltons, as measured by gel permeation chromatography versus polystyrene standards in methylene chloride solvent. Preferred polyimide sulfone resins and particularly polyetherimide sulfone resins have a Mw from 10,000 to 85,000 daltons. More preferred polyimide sulfone resins and particularly polyetherimide sulfone resins have a Mw from 20,000 to 75,000 daltons. Such polyimide sulfone resins typically have an intrinsic viscosity greater than about 0.2 deciliters per gram (dl/g), preferably about 0.35 to about 0.7 dl/g measured in chloroform or o-cresol at 25° C. Polyimide sulfone resins of the invention typically have a polydispersity less than 3.0. More preferred polyimide sulfone resins have polydispersity from 2.0 to 2.7. Polyimide sulfone resins and particularly polyetherimide sulfones of the invention typically have a Tg of at least 190° C., or greater than 200° C., or in a range of between 200° C. and 350° C. Polyetherimide sulfones made from polymerization of BPADA and DDS are especially preferred for their high Tg, typically around 248° C., and their good melt processability as indicated by extrusion and molding into clear parts with no splay, voids or silver streaks.

Polyimide sulfone resins may have varying levels of amine and anhydride end groups depending on the amounts of diamine and dianhydride used in the polymerization reaction and the degree of completeness of the polymerization reaction. A variety of amine and anhydride and/or anhydride derivatives such as carboxylic acid, carboxylate salts, amide-acids and amide-carboxylate salts are examples of possible end groups. In the present context it will be understood that the term "amine end groups" comprises end groups which are amines and any related end groups which are derived from amine end groups. In the present context it will also be understood that the term "anhydride end groups" comprises end groups which are anhydrides and anhydride derivatives such as carboxylic acid, carboxylate salts, amide-acids and amide-carboxylate salts. All types, more than one type or essentially one type of these end groups may be present. Also in the present context it will be understood that the term "reactive end group" refers to any of the various possible end groups on polyimide sulfones which may give rise to volatile species during thermal processing. Most reactive end groups will be one or both of amine and anhydride; In general total reactive end group concentrations can vary from 1 to about 120 milliequivalents/kilogram (meq/kg) resin. In a particular embodiment polyimide sulfones of the invention have a total amine and anhydride end group concentration of less than about 120 milliequivalents/kilogram resin. In many embodiments it is preferred to use at least one aromatic dicarboxylic acid anhydride or at least one primary monoamine to control polyimide sulfone molecular weight. In these cases amine and anhydride end groups will be lower, typically from 10 to 120 meq/kg resin, preferably less than about 60 meq/g; more preferably from 10 to 50 meq/kg resin, still more preferably less than about 40 meq/g; more preferably from 1 to 20 meq/kg resin, or still more preferably less than about 20 meq/kg resin.

The concentration of amine and anhydride end groups can be analyzed by various titration and spectroscopic methods well known in the art. Spectroscopic methods include, infrared, nuclear magnetic resonance, Raman spectroscopy, and fluorescence. Examples of infrared methods are described in J. A. Kreuz, et al, J. Poly. Sci. Part A-1, vol. 4, pp. 2067–2616 (1966). Examples of titration methods are described in Y. J. Kim, et al, Macromolecules, vol. 26, pp. 1344–1358 (1993). It may be advantageous to make derivatives of polymer end groups to enhance measurement sensitivity using variations of methods as described in K. P.

Chan et al., Macromolecules, vol. 27, p. 6731 (1994) and J. S. Chao, Polymer Bull., vol. 17, p. 397 (1987).

In a particular embodiment of the invention the concentration of end groups on the polyimide sulfone product is measured in the reaction mixture at any convenient time during synthesis of the polyimide sulfone. For example the concentration of end groups can, be measured at a specific time, or when the polymer has been determined to have reached some molecular weight or viscosity target, or when the water being removed from the reaction is observed to diminish or essentially stop. If the analysis shows that the total concentration of reactive end groups is greater than 120 meq/kg, then at least one of aromatic diamine monomer or aromatic dianhydride monomer or primary monoamine capping agent or aromatic dicarboxylic acid anhydride capping agent may be added to the reaction mixture to reduce the total concentration of reactive end groups to 120 meq/kg or less. The steps of analyzing the polymer in the reaction mixture for end group concentration and optionally adding an amount of at least one of monomers or capping agents to the reaction mixture to reduce reactive end group concentration may be performed as many times as necessary to provide a reactive end group concentration at or below 120 meq/kg in the final polymer product. In one embodiment the polymer in the reaction mixture is analyzed for end group concentration, then at least one of monomers or capping agents is added to the reaction mixture, and then, after sufficient time for further reaction, the polymer is reanalyzed for end group concentration before the product is subjected to steps comprising isolation from the melt or from solvent. In another embodiment the polymer in the reaction mixture is analyzed for end group concentration and then subjected to steps comprising isolation. In the present context isolation means isolation of solid polyimide sulfone with less than a certain concentration of volatile species, including solvent if the polymer was made in solution.

The polymerization reaction to form polyimide sulfones produces water as a byproduct. In particular one mole of water is formed in the reaction of anhydride with amine to form first an amide-acid and then finally an imide linkage. These amide-acid groups may be end groups or groups within the polymer chain. Water may be removed from the reaction by any known method. In a particular embodiment water is removed from the reaction by distillation or devolatilization, typically at 50–370° C. and optionally at reduced pressure. When the polyimide sulfone is made in a solvent, then water may be removed in some embodiments through simple distillation or azeotropic distillation during the reaction. Following removal of water the polymer concentration in the solvent is typically from 20% to 60% by weight.

Low levels of residual volatile species in the final polymer product are achieved by known methods, for example, by devolatilization or distillation. In some particular embodiments the bulk of any solvent may be removed and any residual volatile species may be removed from the polymer product by devolatilization or distillation, optionally at reduced pressure. In other particular embodiments the polymerization reaction is taken to some desired level of completion in solvent, and then the polymerization is essentially completed and most remaining water is removed during at least one devolatilization step following the initial reaction in solution. Said devolatilization step is performed at a temperature and for a time sufficient to complete the polymerization reaction. In a particular embodiment the polymerization reaction is taken to 70–90% completion in solvent, and then the polymerization is essentially completed and remaining water is removed during at least one devolatilization step following the initial reaction in solution. Apparatuses to devolatilize the polymer mixture and reduce solvent and other volatile species to the low levels needed for good melt processability are generally capable of high temperature heating under vacuum with the ability to rapidly generate high surface area to facilitate removal of the volatile species. The mixing portions of such apparatuses are generally capable of supplying sufficient power to pump, agitate and stir the high temperature, amorphous polyimide sulfone melt which may become very viscous as most of the solvent is removed.

Suitable devolatilization apparatuses include, but are not limited to, wiped films evaporators, for example those made by the LUWA company; and devolatilizing extruders, especially twin screw extruders with multiple venting sections, for example those made by the Werner Pfleiderer company or Welding Engineers. In some cases disc ring reactors, in which a series of metal discs are rotated through a viscous solvent-polymer mixture while exposing the mixture to vacuum may be used to reduce solvent to a very low level. To obtain low levels of high boiling, polar solvents that may have strong interaction with the polar groups of the polymer, it is sometimes necessary to use multiple devolatilization steps, for example two wiped film evaporators used in series, or a devolatilizing extruder used in a serial combination with a wiped film evaporator.

Polyimide sulfones of the present invention, particularly those made in a solvent process, have low levels of residual volatile species, such as residual solvent and/or water. In particular embodiments the polyimide sulfone has a residual volatile species concentration of less than about 500 ppm, or less than about 300 ppm, or less than about 200 ppm, or less than about 100 ppm.

It is often useful to melt filter the polyimide sulfone resins using known melt filtering techniques to remove foreign material, carbonized particles, crosslinked resin or similar impurities. Melt filleting can occur during initial resin isolation and solvent removal or in a subsequent step. In general melt filtering using a filter with pore size sufficient to remove particles with a dimension of greater than or equal to about 100 microns is preferred.

The polyimide sulfone resins of the invention may optionally be further blended with reinforcements, fillers and colorants, as well as with other resins. Reinforcing fiber and fillers may comprise from about 5 to about 50 weight percent and preferably from about 10 to about 35 weight percent of the composition based on the total weight of the composition. The preferred reinforcing fibers are glass, ceramic and carbon, and are generally well known in the art, as are their methods of manufacture.

In one embodiment, glass is preferred, especially glass that is relatively soda free. Fibrous glass filaments comprised of lime-alumino-borosilicate glass, which is also known as "E" glass, are often especially preferred. The filaments can be made by standard processes, e.g., by steam or air blowing, flame blowing and mechanical pulling. The preferred filaments for plastic reinforcement are made by mechanical pulling. For achieving optimal mechanical properties fiber diameters in a range of 6–20 microns are required with a diameter in a range of 10–15 microns being preferred. In preparing molding compositions it is convenient to use the fiber in the form of chopped strands of from about 3.175 millimeters (mm) to about 12.7 mm long although roving may also be used. Fibers may have non-round cross sections. In articles molded from the compositions, the fiber length is typically shorter presumably due to fiber fragmentation during compounding of the composition. The fibers may optionally be treated with a variety of coupling agents to improve adhesion to the resin matrix. Preferred coupling agents include, but are not limited to, amino, epoxy, amide or mercapto functionalized silanes. Organometallic coupling agents, for example, titanium or zirconium based organometallic compounds, may also be used. Fiber coatings having a high thermal stability are preferred to prevent decomposition of the coating, which could result in foaming or gas generation of the compositions during processing at the high melt temperatures required to form the resins of this invention into molded parts.

Other fillers and reinforcing agents may be used alone or in combination with reinforcing fibers. These include but are not limited to: carbon fibrils, mica, talc, barite, calcium carbonate, wollastonite, milled glass, flaked glass, ground quartz, silica, zeolites, and solid or hollow glass beads or spheres.

The polyimide sulfone resins of the invention may optionally be further blended with other resins to give compositions with beneficial properties. Examples of suitable blend resins include, but are not limited to, polycarbonates, polyester carbonates, polyarylates, polysulfones, polyimide sulfones, polyetherimide sulfones, polyphenylene ethers, polyesters, liquid crystal polyesters, polyamides, polyetherether ketones, polyetherimides, polyphenylene sulfides, polyolefins such as polyethylene and ethylene copolymers with acrylates and methacrylates, polyfluoro polyolefins such a polytetrafluoro ethylene, and silicones and silicone copolymers. The blend resin may be combined with the polyimide sulfone resin in amounts in a range of 0.3 wt. % to 85 wt. % of the entire composition, depending on the resin. In more preferred embodiments the blend resin may be added to the polyimide sulfone in an amount in a range of 10–70 wt. % based on the weight of the entire composition.

The polyimide sulfones of the invention can also be optionally combined with known additives including colorants such as titanium dioxide, zinc sulfide and carbon black; stabilizers such as hindered phenols, aryl phosphites, aryl phosphonites, inorganic halides and thioesters, mold release agents, lubricants, flame retardants, smoke suppressors, and anti-drip agents, for example, those based on fluoro polymers. Ultraviolet light stabilizers can also be added to the composition in effective amounts.

The polyimide sulfones of the present invention can be blended with the aforementioned optional components by a variety of methods involving intimate admixing of the materials with any additional silanes additives desired in the formulation. Because of the availability of melt blending equipment in commercial polymer processing facilities, melt blending procedures are generally preferred, although solution blending is also possible. The temperature of the melt in melt blending processes is preferably minimized in order to avoid excessive degradation of the resins. It is often desirable to maintain the melt temperature between about 285° C. and about 370° C., although higher temperatures can be used provided that the residence time of the resin in the processing equipment is kept short. In some instances, the compounded polyimide sulfone, optionally containing additional components, exits melt processing equipment such as an extruder through small exit holes in a die and the resulting strands of molten resin are cooled by passing the strands through a water bath. The cooled strands can be chopped into small pellets for packaging and further handling.

The polyimide sulfones of the invention may be formed into shaped articles by a variety of common processes for shaping molten polymers such as injection molding, compression molding, extrusion molding and gas assist injection molding. Examples of such articles include electrical connectors, enclosures for electrical equipment, automotive engine parts, lighting sockets and reflectors, electric motor parts, power distribution equipment, communication equipment and the like including devices that have molded-in snap fit connectors. The polyimide sulfone resins can also be made into film and sheet.

In many instances it is desirable to coat the shaped article, or a portion of the article, with a metal surface. Such a coating may provide radio and electromagnetic wave shielding or reflectance. It may also provide the article with an electrically conductive pathway or surface. The coating may be of any metal; however, silver, copper, gold, nickel, aluminum, and chrome as well as alloys containing any of the foregoing are often preferred. The articles may have one or several metal coatings combining different metals or mixtures of metals. The metal surface may be applied using techniques well known in the art, for example, by sputtering, vacuum deposition or electroless metallization.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLE 1

Synthesis of polyetherimide sulfone: Into a reaction vessel was charged 490 kg bisphenol A dianhydride (BPADA; approximate composition: 97.6 mole % BPADA, 2.4 mole % mono N-methyl imide of BPADA), 245 kg of diaminodiphenyl sulfone (DDS), 11.0 kg phthalic anhydride (PA) with 1287 liters of o-dichlorobenzene (ODCB) and 360 grams (g) of a sodium phenyl phosphinate catalyst The reaction mixture was heated at 150–180° C. with removal of water. The product was analyzed for residual amine or anhydride end groups. Additional DDS or BPADA was added to keep the total amine and anhydride end group concentration below 20 meq/kg resin. The reaction was allowed to proceed for an additional 15 minutes and end group concentration was again measured. Additional stoichiometry corrections may be made as needed. The reaction mixture was moved to a hold tank. The tank was kept at 170° C. and fed into a solvent removal system. Solvent was removed using two wiped-film evaporators in series to reduce ODCB to less than 500 ppm. The molten polymer was extruded into strands, cooled in a water bath and chopped to give finished pellets. The resultant polymer had a Mw of about 34,000 daltons, a polydispersity of 2.3 and a Tg of 248° C. Glass transition temperature was measured by differential scanning calorimetry (DSC) according to ASTM D3418. The polymer was dried for 3 hours (hr) at 160° C. and injection molded at 370° C. into clear parts with no splay or silver streaking. Another portion of the polymer was dried and extruded into thin film with no voids, holes, splay or streaking.

EXAMPLE 2

Synthesis of polyetherimide sulfone: Into a reaction vessel was charged 490 kg BPADA (approximate composition, 97.6 mole % BPADA; and 2.4 mole % mono N-methyl imide of BPADA), 245 kg of diaminodiphenyl sulfone (DDS) and 11.0 kg phthalic anhydride (PA) with 1287 liters of o-dichlorobenzene. The reaction mixture was heated at 150–180° C. until water removal was complete. The product was checked for residual amine or anhydride end groups. Additional DDS or BPADA was added to keep the total amine and anhydride end group concentration below 20 meq/kg resin. The reaction was allowed to proceed for an additional 15 minutes and end group concentration was again verified. Additional stoichiometry corrections may be made as needed. The reaction mixture was moved to a hold tank. The tank was kept at 170° C. and fed into a solvent removal system. Solvent was removed using one wiped film evaporator in series with a non-intermeshing, devolatilizing twin screw extruder. ODCB was reduced to less than 500 ppm. The molten polymer was extruded into strands, cooled in a water bath and chopped to give finished pellets. The resultant polymer had a Mw of about 34,000, a polydispersity of 2.3 and a Tg of 249° C.

EXAMPLE 3

Synthesis of stabilized polyetherimide sulfone: Into a reaction vessel was charged 490 kg BPADA (approximate composition, 97.6 mole % BPADA, and 2.4 mole % mono N-methyl imide of BPADA), 245 kg of diaminodiphenyl sulfone (DDS) and 11.0 kg phthalic anhydride (PA) with 1287 liters of o-dichlorobenzene. The reaction mixture was heated to 150–180° C. until water removal was complete. The product was checked for residual amine or anhydride end groups. Additional DDS or BPADA was added to keep the total amine and anhydride end group concentration below 20 meq/kg. The reaction was allowed to proceed for an additional 15 minutes and end group concentration was again measured. Additional stoichiometry corrections may be made as needed. Once the imidization was essentially complete and no further water was evolved, 1.46 kg of an aryl phosphonite, PEPQ from Clairant Co., was added. The reaction mixture was moved to a hold tank. The tank was kept at 170° C. and fed into a solvent removal system. Solvent was removed using two wiped film evaporators in series to reduce ODCB down to less than 500 ppm. The molten polymer was extruded into strands, cooled in a water bath and chopped to give finished pellets. The resultant polymer had a Mw of about 34,000, a polydispersity of 2.4 and a Tg of 250° C.

EXAMPLE 4

Synthesis of stabilized polyimide/polyetherimide sulfone copolymer: Into a reaction vessel was charged 441 kg BPADA (approximate composition, 97.6 mole % BPADA, and 2.4 mole % mono N-methyl imide of BPADA), 25.6 kg of pyromellitic dianhydride (PMDA), 245 kg of diaminodiphenyl sulfone (DDS) and 11.0 kg phthalic anhydride (PA) with 1177 liters of o-dichlorobenzene. The reaction mixture was heated to 150–180° C. until water removal was complete. The product was checked for residual amine or anhydride end groups. Additional DDS or BPADA was added to keep the total amine and anhydride end group concentration below 20 meq/kg resin. The reaction was allowed to proceed for an additional 15 minutes and end group concentration was again measured. Additional stoichiometry corrections may be made as needed. Once the imidization was essentially complete and no further water was evolved, 1.46 kg of an aryl phosphonite was added. The reaction mixture was moved to a hold tank. The tank was kept at 170° C. and fed into a solvent removal system. Solvent was removed using two wiped film evaporators in series to reduce ODCB to less than 500 ppm. The molten polymer was extruded into strands, cooled in a water bath and chopped to give finished pellets. The resultant polymer had a Mw of about 34,000, a polydispersity of 2.3 and a Tg of 258° C. The polymer was injection molded into parts at 370° C. that were free of splay or silver streaking.

The resin products of Examples 1–4 were further melt filtered using a single screw extruder with an 80 micron filter, extruded into strands, cooled and cut into pellets. The pellets were dried for 3 hr at 160° C. and then injection molded into parts at 370–390° C. The resin in the molded parts showed less than 30% change in molecular weight and melt flow as measured at 367° C. The molded parts were free of splay or silver streaking.

EXAMPLE 5

Synthesis of polyetherimide sulfone with reactive end-groups: A polyetherimide sulfone is synthesized as described in Example 2 except that initial analysis shows residual amine or anhydride end groups, and no additional monomer is added to correct the stoichiometry. The isolated polymer shows total amine and anhydride end group concentration above 40 meq/kg resin. The polymer is converted into pellets and injection molded into parts at 370° C. The molded parts show splay or silver streaking.

EXAMPLE 6

Synthesis of polyetherimide sulfone containing residual solvent: A polyetherimide sulfone is synthesized as described in Example 2 and solvent is removed using one wiped film evaporator in series with a non-intermeshing, devolatilizing twin screw extruder. The devolatilization efficiency is such that the remaining ODCB level in the polymer is greater than 500 ppm. The polymer is converted into pellets and injection molded into parts at 370° C. The molded parts show splay or silver streaking.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A polyimide sulfone resin with a glass transition temperature of from 200–350° C., residual volatile species concentration of less than 500 ppm and a total reactive end group concentration of less than about 120 milliequivalents/kilogram resin.

2. The polyimide sulfone resin of claim 1 which is a polyetherimide sulfone.

3. The polyimide sulfone resin of claim 2 wherein at least 50 mole % of the polyetherimide sulfone repeating units comprise at least one aryl ether linkage, at least one aryl sulfone linkage and at least two aryl imide linkages.

4. The polyimide sulfone resin of claim 1 comprising structural units derived from an aromatic dianhydride selected from the group consisting of 4,4'-bis(3,4-dicarboxyphenoxy)diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride; 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 2,2-bis([4-(2,3-dicarboxyphenoxy) phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 2-[4-(3,4-dicarboxyphenoxy)phenyl]-2-[4-(2,3-dicarboxyphenoxy) phenyl]propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 1,4,5,8-naphthalenetetracarboxylic acid dianhydride; 3,4,3',4'-benzophenonetetracarboxylic acid dianhydride; 2,3,3',4'-benzophenonetetracarboxylic acid dianhydride; 3,3',4,4'-oxydiphthalic anhydride; 2,3,3',4'-oxydiphthalic anhydride, 3,3',4,4'-biphenyltetracarboxylic acid dianhydride; 2,3,3',4'-biphenyltetracarboxylic acid dianhydride; 2,3,2',3'-biphenyltetracarboxylic acid dianhydride; pyromellitic dianhydride; 3,4,3',4'-diphenylsulfonetetracarboxylic acid dianhydride; 2,3,3',4'-diphenylsulfonetetracarboxylic acid dianhydride; 1,4-bis(3,4-dicarboxyphenoxy)benzene dianhydride; 2,2-bis(3,4-dicarboxyphenyl)hexafluoropropane dianhydride; and mixtures comprising at least two dianhydrides.

5. The polyimide sulfone resin of claim 4 wherein the aromatic dianhydride comprises 2,2-bis[4-(3,4-dicarboxyphenoxy)phenyl]propane dianhydride.

6. The polyimide sulfone resin of claim 4 wherein the aromatic dianhydride comprises 2,2-bis[4-(3,4-dicarboxyphenoxy)phenyl]propane dianhydride and pyromellitic dianhydride.

7. The polyimide sulfone resin of claim 4 wherein the aromatic dianhydride comprises at least one of 3,3',4,4'-oxydiphthalic anhydride or 2,3,3',4'-oxydiphthalic anhydride.

8. The polyimide sulfone resin of claim 1 comprising structural units derived from an aromatic diamine selected from the group consisting of meta-phenylenediamine; para-phenylenediamine; bis(4-aminophenyl)-2,2-propane; 4,4'-diaminodiphenyl, 3,4'-diaminodiphenyl, 4,4'-diaminodiphenyl ether, 3,4'-diaminodiphenyl ether, 3,3'-diaminodiphenyl ether, 4,4'-diaminodiphenyl sulfone, 3,4'-diaminodiphenyl sulfone, 3,3'-diaminodiphenyl sulfone, 4,4'-diaminodiphenyl sulfide; 3,4'-diaminodiphenyl sulfide; 4,4'-diaminodiphenyl ketone, 3,4'-diaminodiphenyl ketone, 4,4'-diaminodiphenylmethane; 4,4'-bis(4-aminophenoxy)biphenyl; 4,4'-bis(3-aminophenoxy)biphenyl, 1,5-diaminonaphthalene; 3,3-dimethylbenzidine; 3,3-dimethoxybenzidine; benzidine; bis(aminophenoxy)fluorene, 1,3-bis(3-aminophenoxy)benzene, 1,3-bis(4-aminophenoxy)benzene, 1,4-bis(4-aminophenoxy)benzene, bis(4-(4-aminophenoxy)phenyl) sulfone, bis(4-(3-aminophenoxy)phenyl)sulfone, 3,3'-diaminobenzophenone, 4,4'-diaminobenzophenone, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, diaminobenzanilide, and mixtures of two or more diamines.

9. The polyimide sulfone resin of claim 8 wherein the aromatic diamine comprises at least one of diaminodiphenyl sulfone or bis(aminophenoxy phenyl)sulfone.

10. The polyimide sulfone resin of claim 1 wherein the polyimide sulfone further comprises structural units derived from a capping agent selected from the group consisting of aromatic dicarboxylic acid anhydrides and primary monoamines.

11. The polyimide sulfone resin of claim 10 wherein the capping agent is selected from the group consisting of aniline, chloroanilines, perfluoromethyl anilines, naphthyl amines, phthalic anhydride, chlorophthalic anhydride, and mixtures of the foregoing.

12. The polyimide sulfone resin of claim 1 having a weight average molecular weight of from 20,000 to 75,000.

13. The polyimide sulfone resin of claim 1 having a polydispersity index of from 2.0 to 2.7.

14. The polyimide sulfone resin of claim 1 wherein the structural units of the polyimide sulfone are essentially free of benzylic protons.

15. The polyimide sulfone resin of claim 1 having a residual volatile species concentration of less than 300 ppm.

16. The polyimide sulfone resin of claim 1 having a residual volatile species concentration of less than 100 ppm.

17. The polyimide sulfone resin of claim 1 having a reactive end group concentration of less than about 60 milliequivalents/kilogram resin.

18. The polyimide sulfone resin of claim 1 having a reactive end group concentration of less than about 40 milliequivalents/kilogram resin.

19. A polyetherimide sulfone resin comprising structural units derived from (i) an aromatic dianhydride selected from the group consisting of 2,2-bis[4-(3,4-dicarboxyphenoxy) phenyl]propane dianhydride, pyromellitic dianhydride, oxydiphthalic anhydride, and mixtures thereof; (ii) an aromatic diamine comprising at least one of diaminodiphenyl sulfone or bis(aminophenoxy phenyl)sulfone; and (iii) a capping agent selected from the group consisting of aniline, chloroanilines, perfluoromethyl anilines, naphthyl amines, phthalic anhydride, chlorophthalic anhydride, and mixture of the foregoing;

wherein the resin has a glass transition temperature of from 200–350° C., residual volatile species concentration of less than 500 ppm and a total reactive end group concentration of less than about 120 milliequivalents/kilogram resin.

20. A process to prepare a polyimide sulfone resin comprising the steps of:

reacting an aromatic dianhydride, an aromatic diamine and optionally a capping agent selected from the group consisting of aromatic dicarboxylic acid anhydrides and primary monoamines, in a solvent with a polarity index of greater than or equal to 2.3 and a boiling point of greater than or equal to 150° C., wherein either the dianhydride or the diamine or both further comprise a sulfone linkage, and removing said solvent;

wherein the resultant polyimide sulfone has a glass transition temperature of from 200–350° C., residual volatile species concentration of less than 500 ppm and a total reactive end group concentration of less than about 120 milliequivalents/kilogram resin.

21. The process of claim 20 wherein the polyimide sulfone is a polyetherimide sulfone.

22. The process of claim 21 wherein at least 50 mole % of the polyetherimide sulfone repeating units comprise at least one aryl ether linkage, at least one aryl sulfone linkage and at least two aryl imide linkages.

23. The process of claim 20 wherein the aromatic dianhydride is selected from the group consisting of 4,4'-bis(3,4-dicarboxyphenoxy)diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride; 2,2-bis(4-(3,4-dicarboxyphenoxy)phenyl)propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 2-[4-(3,4-dicarboxyphenoxy)phenyl]-2-[4-(2,3-dicarboxyphenoxy)phenyl]propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 1,4,5,8-naphthalenetetracarboxylic acid dianhydride; 3,4,3',4'-benzophenonetetracarboxylic acid dianhydride; 2,3,3',4'-benzophenonetetracarboxylic acid dianhydride; 3,3',4,4'-oxydiphthalic anhydride; 2,3,3',4'-oxydiphthalic anhydride; 3,3',4,4'-biphenyltetacarboxylic acid dianhydride; 2,3,3',4'-biphenyltetracarboxylic acid dianhydride; 2,3,2',3'-biphenyltetracarboxylic acid dianhydride; pyromellitic dianhydride; 3,4,3',4'-diphenylsulfonetetracarboxylic acid dianhydride; 2,3,3',4'-diphenylsulfonetetracarboxylic acid dianhydride; 1,4-bis(3,4-dicarboxyphenoxy)benzene dianhydride; 2,2-bis(3,4-dicarboxyphenyl)hexafluoropropane dianhydride; and mixtures comprising at least two dianhydrides.

24. The process of claim 20 wherein the aromatic dianhydride comprises 2,2-bis[4-(3,4-dicarboxyphenoxy)phenyl]propane dianhydride.

25. The process of claim 20 wherein the aromatic dianhydride comprises 2,2-bis[4-(3,4-dicarboxyphenoxy)phenyl]propane dianhydride and pyromellitic dianhydride.

26. The process of claim 20 wherein the aromatic dianhydride comprises at least one of 3,3',4,4'-oxydiphthalic anhydride or 2,3,3',4'-oxydiphthalic anhydride.

27. The process of claim 20 wherein the aromatic diamine is selected from the group consisting of meta-phenylenediamine; para-phenylenediamine; bis(4-aminophenyl)-2,2-propane; 4,4'-diaminodiphenyl, 3,4'-diaminodiphenyl, 4,4'-diaminodiphenyl ether; 3,4'-diaminodiphenyl ether, 3,3'-diaminodiphenyl ether, 4,4'-diaminodiphenyl sulfone, 3,4'-diaminodiphenyl sulfone, 3,3'-diaminodiphenyl sulfone, 4,4'-diaminodiphenyl sulfide; 3,4'-diaminodiphenyl sulfide; 4,4'-diaminodiphenyl ketone, 3,4-diaminodiphenyl ketone, 4,4'-diaminodiphenylmethane; 4,4'-bis(4-aminophenoxy)biphenyl; 4,4'-bis(3-aminophenoxy)biphenyl, 1,5-diaminonaphthalene; 3,3-dimethylbenzidine; 3,3-dimethoxybenzidine; benzidine; bis(aminophenoxy)fluorene, 1,3-bis(3-aminophenoxy)benzene, 1,3-bis(4-aminophenoxy)benzene, 1,4-bis(4-aminophenoxy)benzene, bis(4-(4-aminophenoxy) phenyl) sulfone, bis(4-(3-aminophenoxy)phenyl)sulfone, 3,3'-diaminobenzophenone, 4,4'-diaminobenzophenone, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, diaminobenzanilide, and mixtures of two or more diamines.

28. The process of claim 20 wherein the aromatic diamine comprises at least one of diaminodiphenyl sulfone or bis (aminophenoxy phenyl)sulfone.

29. The process of claim 20 wherein the polyimide sulfone further comprises structural units derived from a capping agent selected from the group consisting of aromatic dicarboxylic acid anhydrides and primary monoamines.

30. The process of claim 29 wherein the capping agent is selected from the group consisting of aniline, chloroanilines, perfluoromethyl anilines, naphthyl amines, phthalic anhydride and chlorophthalic anhydride.

31. The process of claim 20 wherein the solvent has an auto ignition temperature of greater than or equal to 70° C.

32. The process of claim 20 wherein the solvent is selected from the group consisting of: halogenated aromatics, chlorobenzene, dichlorobenzene, ortho-dichlorobenzene, bromobenzene, nitrobenzene, diphenyl sulfones, diphenyl ethers, alkoxy aromatics, anisole, phenetole, veratrole, aryl ethers, N-alkyl pyrrolidinone, dimethyl sulfoxide, dimethyl acetamide, dimethyl formamide, benzonitrile, hexamethyl phosphoramide, pyridine, pyrrole, sulfolane, methyl benzoate, and mixtures thereof.

33. The process of claim 20 wherein the polymer concentration in the solvent is from 20% to 60% by weight.

34. The process of claim 20 wherein the step of removing the solvent comprises using a process selected from the group consisting of: wiped film evaporation, devolatilizing extrusion, disc ring evaporation and combinations thereof.

35. The process of claim 20 wherein the resultant polymer has weight average molecular weight of from 20,000 to 75,000.

36. The process of claim 20 wherein the resultant polymer has a polydispersity index of from 2.0 to 2.7.

37. The process of claim 20 wherein the structural units of the polyimide sulfone are essentially free of benzylic protons.

38. The process of claim 20 wherein the resultant polymer has a residual volatile species concentration of less than 300 ppm.

39. The process of claim 20 wherein the resultant polymer has a residual volatile species concentration of less than 100 ppm.

40. The process of claim 20 which further comprises: at least one step of analyzing the reactive end group concentration of the polyimide sulfone before removing the solvent, and optionally adding at least one of aromatic dianhydride or aromatic diamine or primary monoamine capping agent or aromatic dicarboxylic acid anhydride capping agent.

41. The process of claim 40 wherein at least one of aromatic dianhydride or aromatic diamine or primary monoamine capping agent or aromatic dicarboxylic acid anhydride capping agent is added and the reactive end group concentration of the polyimide sulfone is reanalyzed.

42. The process of claim 20 wherein the resultant polymer has a reactive end group concentration of less than about 60 milliequivalents/kilogram resin.

43. The process of claim 20 wherein the resultant polymer has a reactive end group concentration of less than about 40 milliequivalents/kilogram resin.

44. The process of claim 20 further comprising the step of passing the resultant polymer in a molten state through a filter which will remove particles of greater than or equal to about 100 microns.

45. A process to prepare a polyetherimide sulfone resin comprising the step of:
reacting an aromatic dianhydride, an aromatic diamine and at least one capping agent selected from the group consisting of aromatic dicarboxylic acid anhydrides and primary monoamines, in a solvent with a polarity index of greater than or equal to 2.3 and a boiling point of greater than or equal to 150° C., wherein either the dianhydride or the diamine or both further comprise a sulfone linkage; and removing said solvent using a process selected from the group consisting of: wiped film evaporation, devolatilizing extrusion, disc ring evaporation and combinations thereof;

wherein the resultant polyetherimide sulfone resin has a Tg of from 200–350° C., residual volatile species concentration of less than 500 ppm and a total reactive end group concentration of less than about 120 milliequivalents/kilogram resin.

46. The process of claim 45 wherein at least 50 mole % of the polyetherimide sulfone repeating units comprise at least one aryl ether linkage, at least one aryl sulfone linkage and at least two aryl imide linkages.

47. The process of claim 45 wherein the aromatic dianhydride comprises 2,2-bis[4-(3,4-dicarboxyphenoxy)phenyl]propane dianhydride.

48. The process of claim 45 wherein the aromatic dianhydride comprises 2,2-bis[4-(3,4-dicarboxyphenoxy)phenyl]propane dianhydride and pyromellitic dianhydride.

49. The process of claim 45 wherein the aromatic dianhydride comprises at least one of 3,3',4,4'-oxydiphthalic anhydride or 2,3,3',4'-oxydiphthalic anhydride.

50. The process of claim 45 wherein the aromatic diamine comprises at least one of diaminodiphenyl sulfone or bis(aminophenoxy phenyl)sulfone.

51. The process of claim 45 wherein the capping agent is selected from the group consisting of aniline, chloroanilines, perfluoromethyl anilines, naphthyl amines, phthalic anhydride and chlorophthalic anhydride.

52. The process of claim 45 wherein the solvent is selected from the group consisting of: halogenated aromatics, chlorobenzene, dichlorobenzene, ortho-dichlorobenzene, bromobenzene, diphenyl sulfones, diphenyl ethers, alkoxy aromatics, anisole, phenetole, veratrole, aryl ethers, N-alkyl pyrrolidinone, dimethyl sulfoxide, dimethyl acetamide, dimethyl formamide, benzonitrile, sulfolane and mixtures thereof.

53. The process of claim 45 wherein the resultant polymer has a residual volatile species concentration of less than 300 ppm.

54. The process of claim 45 wherein the resultant polymer has reactive end group concentration of less than about 40 milliequivalents/kilogram resin.

55. The process of claim 45 further comprising the step of passing the resultant polyetherimide sulfone through a filter of less than or equal to about 100 microns.

56. The process of claim 45 wherein the structural units of the polyetherimide sulfone are essentially free of benzylic protons.

57. An article made from the polyimide sulfone resin of claim 1.

58. An article made from the polyetherimide sulfone resin of claim 2.

59. An article made from the polyetherimide sulfone resin of claim 19.

60. The article of claim 57 wherein the article is metallized with a reflective metal coating.

61. The article of claim 58 wherein the article is metallized with a reflective metal coating.

62. The article of claim 59 wherein the article is metallized with a reflective metal coating.

63. The article of claim 57 wherein the article is selected from the group consisting of; reflectors, connectors, sheet, film, cookware, helmets, medical devices, pumps, trays, food containers, handles, gears, computer parts, appliances, lighting devices and automotive parts.

64. The article of claim 58 wherein the article is selected from the group consisting of; reflectors, connectors, sheet, film, cookware, helmets, medical devices, pumps, trays, food containers, handles, gears, computer parts, appliances, lighting devices and automotive parts.

65. The article of claim 59 wherein the article is selected from the group consisting of; reflectors, connectors, sheet, film, cookware, helmets, medical devices, pumps, trays, food containers, handles, gears, computer parts, appliances, lighting devices and automotive parts.

* * * * *